United States Patent [19]

Chang et al.

[11] Patent Number: 5,288,475
[45] Date of Patent: Feb. 22, 1994

[54] SYNTHESIS OF ZSM-35

[75] Inventors: Clarence D. Chang, Princeton, N.J.; Stuart D. Hellring, Yardley, Pa.

[73] Assignee: Mobil Oil Corp., Fairfax, Va.

[21] Appl. No.: 963,979

[22] Filed: Oct. 21, 1992

[51] Int. Cl.$^5$ .............................................. C01B 33/34
[52] U.S. Cl. ................................ 423/706; 423/328.2; 502/71; 502/77
[58] Field of Search ........................... 502/64, 71, 77; 423/706

[56] References Cited

U.S. PATENT DOCUMENTS

| | | | |
|---|---|---|---|
| 4,016,245 | 4/1977 | Plank et al. | 423/328 |
| 4,107,195 | 8/1978 | Rollmann | 260/448 C |
| 4,584,286 | 4/1986 | Valyocsik | 502/62 |
| 4,925,548 | 5/1990 | Rubin | 208/46 |
| 5,174,980 | 12/1992 | Hellring et al. | 502/77 |

Primary Examiner—Anthony McFarlane
Attorney, Agent, or Firm—Alexander J. McKillop; Dennis P. Santini; Edward F. Kenehan, Jr.

[57] ABSTRACT

This invention relates to a method for synthesizing ZSM-35 using a 1,4-dimethylpiperazine directing agent.

9 Claims, No Drawings

SYNTHESIS OF ZSM-35

BACKGROUND

There is provided a method for synthesizing a crystalline ferrierite-type material identified as ZSM-35.

Ferrierite is a naturally occurring zeolite with an intersecting 10-ring by 8-ring structure. ZSM-35 is shown to be synthesized from reaction mixtures containing ethylene diamine or pyrrolidine directing agent in U.S. Pat. Nos. 4,016,245 and 4,107,195. Synthetic ferrierite is directed from a certain reaction mixture in U.S. Pat. No. 4,000,248 containing N-methylpyridinium; and another reaction mixture containing choline in U.S. Pat. No. 4,046,859. Piperidine is the directing agent in U.S. Pat. No. 4,251,499 for synthetic ferrierite. U.S. Pat. Nos. 4,323,481 and 4,390,457 teach synthesis of ferrierite from reaction mixtures comprising directing agents of 2,4-pentanedione and 2-aminopyridine, respectively. U.S. Pat. No. 4,377,502 shows morpholine or dioxane used as directing agent for ferrierite synthesis. U.S. Pat. No. 4,584,286 teaches a method for synthesis of ZSM-35 from a reaction mixture comprising bis(N-methylpyridyl) ethylinium as directing agent. Both U.S. Pat. Nos. 4,578,259 and 4,695,440 show use of pyridine plus ethylene glycol as directing agent for synthetic ferrierite; and both U.S. Pat. Nos. 4,721,607 and 4,855,270 show use of pyridine plus ethylene diamine and ethanol as directing agent for synthetic ferrierite. U.S. Pat. No. 4,925,548 teaches synthesis of ZSM-35 with hexamethyleneimine directing agent.

The above disclosures are incorporated herein by reference as to ZSM-35, synthetic ferrierite and their synthesis.

SUMMARY

There is provided a method for synthesizing ZSM-35, said method comprising (i) preparing a mixture capable of forming said ZSM-35, said mixture comprising sources of alkali or alkaline earth metal (M), an oxide of trivalent element (X), an oxide of tetravalent element (Y), water and directing agent (R) of 1,4-dimethylpiperazine, and having a composition, in terms of mole ratios, within the following ranges:

| | |
|---|---|
| $YO_2/X_2O_3$ | 1 to 100 |
| $H_2O/YO_2$ | 10 to 100 |
| $OH^-/YO_2$ | 0 to 0.25 |
| $M/YO_2$ | 0 to 2.0 |
| $R/YO_2$ | 0.18 to 2.0 |

(ii) maintaining said mixture under sufficient conditions until crystals of said material are formed; and (iii) recovering said crystalline material from step (ii).

Embodiments

The present method may comprise forming a reaction mixture hydrogel containing sources of alkali or alkaline earth metal (M) cations; an oxide of trivalent element (X), e.g., aluminum, boron, iron, gallium, indium and mixtures thereof; an oxide of tetravalent element (Y), e.g., silicon, germanium, tin and mixtures thereof; a directing agent (R) of 1,4-dimethylpiperazine; and water, said reaction mixture having a composition in terms of mole ratios, within the following ranges:

| Reactants | Useful | Preferred |
|---|---|---|
| $YO_2/X_2O_3$ | 1 to 100 | 10 to 50 |
| $H_2O/YO_2$ | 10 to 100 | 15 to 50 |
| $OH^-/YO_2$ | 0 to 0.25 | 0 to 0.1 |
| $M/YO_2$ | 0 to 2.0 | 0.10 to 1.0 |
| $R/YO_2$ | 0.18 to 2.0 | 0.18 to 1.0 |

Reaction conditions may comprise heating the foregoing reaction mixture to a temperature of from about 100° C. to about 200° C. for a period of time of from about 10 hours to about 10 days. A more preferred temperature range is from about 130° C. to about 180° C. with the amount of time at a temperature in such range being from about 2 days to about 8 days. The solid product comprising ZSM-35 crystals may be recovered from the reaction medium, as by cooling the whole to room temperature, filtering and water washing.

The present organic directing agent, i.e., 1,4-dimethylpiperazine, has the ability to function as a template in the nucleation and growth of ZSM-35 crystals from a low $YO_2$, e.g., $SiO_2$, low alkalinity, e.g., low $OH^-/YO_2$, reaction mixture. This is true even though no predigestion of the gel is required prior to crystallization. The reaction mixture may be X-rich, e.g., aluminum-rich, with a $YO_2/X_2O_3$ molar ratio of from about 1/1 to about 100/1, preferably from about 10/1 to about 50/1, most preferably from about 10/1 to about 30/1.

It will be noted that the ratio of components of the reaction mixture required herein have an influence on the nature of the product obtained. For instance, if the $YO_2/X_2O_3$ ratio is above about 100, something other than ZSM-35 may form. In general, with higher $YO_2/X_2O_3$ ratios in the reaction mixture, crystallization of layered material increases and ZSM-35 decreases. Further, at $YO_2/X_2O_3$ molar ratios less than about 100/1, the $R/YO_2$ mole ratio minimum for most successful ZSM-35 synthesis is usually about 0.18/1. When this ratio drops below about 0.18 at the $YO_2/X_2O_3$ ratios of, for example, 21 or less, mixtures of layered and amorphous materials may comprise the product. Still further, for most effective synthesis of ZSM-35 by this method, the $OH^-/YO_2$ ratio should generally not be less than 0.

The synthesis of the present invention is facilitated when the reaction mixture comprises seed crystals, such as those having the structure of ZSM-35. The use of at least 0.01%, preferably about 0.10%, and even more preferably about 1% seed crystals (based on total weight) of crystalline material may be useful.

The reaction mixture composition for the synthesis of ZSM-35 crystals can be prepared utilizing materials which can supply the appropriate oxide. The useful sources of $X_2O_3$, e.g., aluminum oxide, iron oxide and/or boron oxide, include, as non-limiting examples, any known form of such oxide, e.g., aluminum oxide or hydroxide, organic or inorganic salt or compound, e.g., alumina, aluminates and borates. The useful sources of $YO_2$, e.g., silicon oxide, include, as non-limiting examples, known forms of such oxide, e.g., silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution The reaction mixture can be prepared either batchwise or continuously. Crystal size and crystallization time for the product composition comprising the ZSM-35 crystals may vary with the exact nature of the reaction mixture employed within the above limitations.

The ZSM-35 crystal composition prepared hereby has a characteristic X-ray diffraction pattern, including values substantially as set forth in Table 1, hereinafter.

TABLE 1

| Interplanar d-Spacing, (A) | Relative Intensity ($I/I_o$) |
|---|---|
| 11.40 ± 0.1 | W |
| 9.55 ± 0.2 | M-S |
| 7.07 ± 0.05 | M |
| 6.97 ± 0.02 | W-M |
| 6.62 ± 0.03 | W-M |
| 5.79 ± 0.05 | W |
| 5.69 ± 0.03 | W |
| 4.00 ± 0.02 | S |
| 3.95 ± 0.02 | M |
| 3.87 ± 0.03 | W |
| 3.78 ± 0.03 | M |
| 3.68 ± 0.03 | W |
| 3.55 ± 0.03 | VS |
| 3.48 ± 0.02 | S |
| 3.40 ± 0.05 | W |
| 3.31 ± 0.03 | W-M |
| 3.15 ± 0.03 | W-M |
| 3.07 ± 0.03 | W |
| 2.87 ± 0.04 | W |

These X-ray diffraction data may be collected with a Rigaku diffraction system, equipped with a graphite diffracted beam monochromator and scintillation counter, using copper K-alpha radiation. The diffraction data may be recorded by step-scanning at 0.02 degrees of two-theta, where theta is the Bragg angle, and a counting time of 1 second for each step. The interplanar spacings, d's, may be calculated in Angstrom units (A), and the relative intensities of the lines, $I/I_o$, where $I_o$ is one-hundredth of the intensity of the strongest line, above background, may be derived with the use of a profile fitting routine (or second derivative algorithm). The intensities may be uncorrected for Lorentz and polarization effects. The relative intensities are given in terms of the symbols vs=very strong (75-100), s=strong (50-74), m=medium (25-49) and w=weak (0-24). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline ZSM-35 prepared hereby may have a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is from about 1 to about 100, usually from about 10 to about 50, more usually from about 10 to about 30. In the as-synthesized form, the crystalline material may have a formula, on an anhydrous basis and in terms of moles of oxides per y moles of $YO_2$, as follows:

$$(0.4 \text{ to } 0.6)M_2O:(0.4 \text{ to } 0.6)R_2O:X_2O_3:(y)YO_2$$

wherein M and R are as defined above. The M and R components are associated with the material as a result of their presence during crystallization, and are easily removed by post-crystallization methods hereinafter more particularly described.

Synthetic ZSM-35 crystals prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation- dehydrogenation function is to be performed. Such components can be exchanged into the composition, impregnated therein or physically intimately admixed therewith. Such components can be impregnated in or on to the ZSM-35 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic ZSM-35 crystals, when employed either as an adsorbent or as a catalyst in a hydrocarbon conversion process, may be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized ZSM-35 can be prepared by heating same at a temperature of from about 200° C. to about 550° C. for from 1 hour to about 48 hours.

The original cations, e.g., alkali or alkaline earth metal, of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB and VIII of the Periodic Table of the Elements, especially gallium, indium and tin.

A typical ion exchange technique would be to contact the synthetic ZSM-35 material with a salt of the desired replacing cation or cations. Examples of such salts include the halides, e.g., chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the ZSM-35 may then be washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline ZSM-35 may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline material can be extruded before drying or dried or partially dried and then extruded.

In the case of many catalysts, it is desired to incorporate the crystals hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g., alumina, titania and/or zirconia. The latter may be either naturally occurring or in the form of gelatinous precipitates, sols or gels including mixtures of silica and metal oxides. Use of a material in conduction with the ZSM-35, i.e., combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g., bentonite and kaolin. These materials, i.e., clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized crystalline material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present crystals can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalytically active form of the catalyst of this invention which may contain additional hydrogenation components, reforming stocks can be reformed employing a temperature between about 370° C. and about 540° C. . The pressure can be between about 100 psig and about 1000 psig, but it is preferably between about 200 psig and about 700 psig. The liquid hourly space velocity is generally between about 0.1 and about 10 hr$^{-1}$, preferably between about 0.5 and about 4 hr , and the hydrogen to hydrocarbon mole ratio is generally between about 1 and about 20, preferably between about 4 and about 12.

The catalyst can also be used for hydroisomerization of normal paraffins, when provided with a hydrogenation component, e.g., platinum. Hydroisomerization is carried out at a temperature between about 90° C. and 375° C. , preferably about 145° C. to about 290° C., with a liquid hourly space velocity between about 0.01 and about 2 hr$^{-1}$, preferably between about 0.25 and about 0.50 hr$^{-1}$, employing hydrogen such that the hydrogen to hydrocarbon mole ratio is between about 1:1 and about 5:1.

The catalyst can also be used for reducing the pour point of gas oils. This reaction may be conducted at a liquid hourly space velocity between about 10 and about 30 hr$^{-1}$ and at a temperature between about 400° C. and about 540° C.

Other reactions which can be accomplished employing the catalyst of this invention containing a metal, e.g., platinum, include hydrogenation-dehydrogenation reactions and desulfurization reactions.

Example 1

To water (47.2 g) was added sodium aluminate (1.444 g, technical grade, 74% solids) and sodium hydroxide (0.560 g). This mixture was stirred briefly to complete dissolution, then 1,4-dimethylpiperazine (2.249 g) was added. To this solution was added silica (Ultrasil, 9.13 g), and the resulting gel was transferred to a teflon liner, placed in an autoclave, pressurized (100 psig), sealed, then heated (145° C.) with stirring (~350 rpm) for 8 days. After cooling, the product was suction filtered, washed with water, then dried (110° C., in vacuo) to give ZSM-35 as a white powder (9.275 g). The XRD pattern ($\lambda = 1.5418$) of the product was as follows:

| Interplanar d-Spacing (A) | Degrees 2-Theta | Relative Intensity |
|---|---|---|
| 19.812 | 4.460 | 19.85 |
| 10.026 | 8.820 | 26.15 |
| 9.489 | 9.320 | 100.00 |
| 7.047 | 12.560 | 33.38 |
| 6.927 | 12.780 | 31.98 |
| 6.578 | 13.460 | 35.33 |
| 5.776 | 15.340 | 11.03 |
| 5.659 | 15.660 | 9.77 |
| 4.939 | 17.960 | 8.11 |
| 4.811 | 18.440 | 5.58 |
| 4.760 | 18.640 | 5.78 |
| 4.110 | 21.620 | 5.71 |
| 3.976 | 22.360 | 67.63 |
| 3.844 | 23.140 | 23.38 |
| 3.776 | 23.560 | 46.97 |
| 3.720 | 23.920 | 21.17 |
| 3.660 | 24.320 | 27.91 |
| 3.528 | 25.240 | 95.00 |
| 3.464 | 25.720 | 69.42 |
| 3.381 | 26.360 | 16.73 |
| 3.307 | 26.960 | 22.27 |
| 3.193 | 27.940 | 10.17 |
| 3.127 | 28.540 | 30.31 |
| 3.046 | 29.319 | 19.24 |
| 2.954 | 30.260 | 11.41 |
| 2.883 | 31.020 | 12.08 |

| Interplanar d-Spacing (A) | Degrees 2-Theta | Relative Intensity |
| --- | --- | --- |
| 2.849 | 31.400 | 6.34 |
| 2.705 | 33.120 | 8.81 |
| 2.638 | 33.980 | 10.21 |
| 2.576 | 34.820 | 6.48 |

After calcination (538° C., 3 hours) of a portion of this material, the resulting product gave the following XRD pattern ($\lambda = 1.5418$).

| Interplanar d-Spacing (A) | Degrees 2-Theta | Relative Intensity |
| --- | --- | --- |
| 9.448 | 9.360 | 100.00 |
| 7.036 | 12.580 | 30.90 |
| 6.568 | 13.480 | 25.35 |
| 5.768 | 15.360 | 10.75 |
| 5.651 | 15.680 | 11.55 |
| 4.928 | 18.000 | 4.77 |
| 4.817 | 18.420 | 4.92 |
| 4.710 | 18.840 | 5.87 |
| 3.969 | 22.400 | 49.13 |
| 3.924 | 22.660 | 30.14 |
| 3.834 | 23.200 | 21.00 |
| 3.767 | 23.620 | 37.10 |
| 3.723 | 23.900 | 14.50 |
| 3.651 | 24.380 | 22.87 |
| 3.526 | 25.260 | 68.78 |
| 3.461 | 25.740 | 53.55 |
| 3.373 | 26.420 | 19.18 |
| 3.302 | 27.000 | 18.51 |
| 3.214 | 27.760 | 4.57 |
| 3.125 | 28.560 | 23.88 |
| 3.038 | 29.400 | 18.06 |
| 2.946 | 30.340 | 9.80 |
| 2.879 | 31.060 | 9.71 |
| 2.840 | 31.500 | 5.12 |
| 2.703 | 33.140 | 7.19 |
| 2.635 | 34.020 | 8.10 |
| 2.572 | 34.880 | 5.25 |

Example 2

To water (47.2 g) was added sodium hydroxide (1.034 g). This mixture was stirred briefly to complete dissolution, then 1,4-dimethylpiperazine (5.583 g) was added. To this solution was added silica (Ultrasil, 0.15 g), and the resulting gel was transferred to a teflon liner, placed in an autoclave, pressurized (100 psig), sealed, then heated (145° C.) with stirring (~350 rpm) for 8 days. After cooling, the product was suction filtered, washed with water, then dried (110° C., in vacuo) to a white powder (7.874 g). The XRD pattern ($\lambda = 1.5418$) of the product was as follows:

| Interplanar d-Spacing (A) | Degrees 2-Theta | Relative Intensity |
| --- | --- | --- |
| 19.463 | 4.540 | 14.72 |
| 15.504 | 5.700 | 78.06 |
| 10.995 | 8.041 | 5.50 |
| 7.775 | 11.381 | 10.33 |
| 5.185 | 17.101 | 14.76 |
| 4.695 | 18.900 | 7.34 |
| 4.291 | 20.700 | 30.02 |
| 4.088 | 21.740 | 100.00 |
| 3.639 | 24.460 | 12.76 |
| 3.551 | 25.080 | 13.98 |
| 3.440 | 25.900 | 45.17 |
| 3.302 | 27.000 | 28.56 |
| 3.147 | 28.360 | 34.95 |
| 2.994 | 29.839 | 6.53 |
| 2.918 | 30.640 | 6.60 |
| 2.863 | 31.240 | 7.49 |
| 2.819 | 33.740 | 7.71 |
| 2.587 | 34.680 | 7.77 |

Calcination of the product (350° C., 2 hours) caused loss of this XRD pattern to a dense phase material to give the following XRD pattern ($\lambda = 1.5418$):

| Interplanar d-Spacing (A) | Degrees 2-Theta | Relative Intensity |
| --- | --- | --- |
| 15.838 | 5.580 | 13.67 |
| 4.299 | 20.660 | 32.20 |
| 4.092 | 21.720 | 100.00 |
| 3.693 | 24.100 | 11.48 |
| 3.344 | 26.660 | 25.10 |
| 3.187 | 28.000 | 11.44 |

Example b 3

To water (47.2 g) was added sodium aluminate (1.440 g, technical grade, 74% solids) and sodium hydroxide (0.545 g). This mixture was stirred briefly to complete dissolution, then 1,4-dimethylpiperazine (5.535 g) was added. To this solution was added silica (Ultrasil, 9.12 g), and the resulting get was transferred to a teflon liner, placed in an autoclave, pressurized (100 psig), sealed, then heated (145° C.) with stirring (~350 rmp) for 8 days. After cooling, the product was suction filtered, washed with water, then dried (110° C., in vacuo) to a white powder (9.186 g). The XRD pattern ($\lambda = 1.5418$) of the product was as follows:

| Interplanar d-Spacing (A) | Degrees 2-Theta | Relative Intensity |
| --- | --- | --- |
| 20.082 | 4.400 | 14.08 |
| 19.463 | 4.540 | 14.06 |
| 10.094 | 8.760 | 47.23 |
| 9.509 | 9.300 | 72.67 |
| 8.952 | 9.880 | 6.50 |
| 7.036 | 12.580 | 38.31 |
| 6.927 | 12.780 | 33.84 |
| 6.578 | 13.460 | 38.89 |
| 5.761 | 15.380 | 10.40 |
| 5.666 | 15.640 | 9.65 |
| 5.143 | 17.240 | 6.70 |
| 4.939 | 17.960 | 10.05 |
| 4.295 | 20.680 | 7.91 |
| 4.110 | 21.620 | 8.21 |
| 3.972 | 22.380 | 72.13 |
| 3.840 | 23.160 | 25.43 |
| 3.776 | 23.560 | 46.23 |
| 3.720 | 23.920 | 25.28 |
| 3.675 | 24.220 | 30.77 |
| 3.607 | 24.680 | 14.17 |
| 3.530 | 25.230 | 100.00 |
| 3.464 | 25.720 | 67.61 |
| 3.406 | 26.160 | 25.11 |
| 3.307 | 26.960 | 21.96 |
| 3.216 | 27.740 | 10.37 |
| 3.193 | 27.940 | 9.06 |
| 3.127 | 28.540 | 30.01 |
| 3.048 | 29.300 | 17.29 |
| 2.952 | 30.280 | 11.12 |
| 2.885 | 30.999 | 14.19 |
| 2.852 | 31.360 | 6.88 |
| 2.706 | 33.100 | 8.02 |
| 2.640 | 33.960 | 11.56 |
| 2.571 | 34.900 | 7.43 |

A portion of the as-synthesized product was calcined (538° C., 3 hours) to give the product which gave the following pattern ($\lambda=1.5418$):

| Interplanar d-Spacing (A) | Degrees 2-Theta | Relative Intensity |
| --- | --- | --- |
| 9.408 | 9.400 | 100.00 |
| 7.025 | 12.600 | 42.13 |
| 6.895 | 12.839 | 38.68 |
| 6.559 | 13.500 | 34.17 |
| 5.724 | 15.480 | 13.27 |
| 5.630 | 15.740 | 14.79 |
| 4.933 | 17.980 | 5.62 |
| 4.730 | 18.760 | 5.50 |
| 4.700 | 18.880 | 5.92 |
| 4.107 | 21.640 | 5.09 |
| 3.965 | 22.420 | 60.83 |
| 3.931 | 22.620 | 34.34 |
| 3.827 | 23.240 | 25.03 |
| 3.763 | 23.640 | 44.32 |
| 3.642 | 24.440 | 24.00 |
| 3.520 | 25.300 | 87.53 |
| 3.456 | 25.780 | 69.46 |
| 3.363 | 26.500 | 16.13 |
| 3.297 | 27.040 | 21.05 |
| 3.119 | 28.620 | 29.54 |
| 3.038 | 29.400 | 18.89 |
| 2.946 | 30.340 | 10.25 |
| 2.879 | 31.060 | 10.89 |
| 2.845 | 31.441 | 5.08 |
| 2.835 | 31.560 | 5.20 |
| 2.697 | 33.220 | 8.29 |
| 2.632 | 34.060 | 9.26 |
| 2.571 | 34.900 | 5.67 |

These data illustrate that the as-synthesized product is a mixture, and that the component giving rise to the lowest-angle peak is unstable to these calcination conditions. The ZSM-35 component is stable.

What is claimed is:

1. A method for using dimethylpiperazine to synthesize ZSM-35, said method comprising (i) preparing a mixture capable of forming said ZSM-35, said mixture comprising sources of alkali or alkaline earth metal (M), an oxide of trivalent element (X), an oxide of tetravalent element (Y), water and directing agent (R) of 1,4-dimethylpiperazine, and having a composition, in terms of mole ratios, within the following ranges:

| | |
| --- | --- |
| $YO_2/X_2O_3$ | 1 to 100 |
| $H_2O/YO_2$ | 10 to 100 |
| $OH^-/YO_2$ | 0 to 0.25 |
| $M/YO_2$ | 0 to 2.0 |
| $R/YO_2$ | 0.18 to 2.0 |

(ii) maintaining said mixture under sufficient conditions until crystals of said material are formed; and (iii) recovering said crystalline material from step (ii).

2. The method of claim 1 wherein said mixture has the following composition ranges:

| | |
| --- | --- |
| $YO_2/X_2O_3$ | 10 to 50 |
| $H_2O/YO_2$ | 15 to 50 |
| $OH^-/YO_2$ | 0 to 0.1 |
| $M/YO_2$ | 0.10 to 1.0 |
| $R/YO_2$ | 0.18 to 1.0 |

3. The method of claim 1 wherein said mixture further comprises seed crystals in sufficient amount to enhance synthesis of said crystalline material.

4. The method of claim 1 wherein said X is aluminum, boron, iron, gallium, indium or a mixture thereof, and said Y is silicon, germanium, tin or a mixture thereof.

5. The method of claim 1 wherein X comprises aluminum and Y comprises silicon.

6. The method of claim 1 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

7. The method of claim 2 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

8. The method of claim 6 wherein said replacing ion is hydrogen or a hydrogen precursor.

9. The method of claim 7 wherein said replacing ion is hydrogen or a hydrogen precursor.

* * * * *